(12) United States Patent
Mei (10) Patent No.: US 9,276,447 B2
(45) Date of Patent: Mar. 1, 2016

(54) ELECTRICAL MACHINES

(75) Inventor: Tian Xiang Mei, Greater Manchester (GB)

(73) Assignees: Stored Energy Technology Limited, Derby (GB); Total Motion Systems Limited, Staffordshire (GB); Intelligent Motion Control Limited, Daventry (GB)

( * ) Notice: Subject to any disclaimer, the term of this patent is extended or adjusted under 35 U.S.C. 154(b) by 397 days.

(21) Appl. No.: 13/818,936

(22) PCT Filed: Aug. 19, 2011

(86) PCT No.: PCT/GB2011/001232
§ 371 (c)(1),
(2), (4) Date: Apr. 8, 2013

(87) PCT Pub. No.: WO2012/025707
PCT Pub. Date: Mar. 1, 2012

(65) Prior Publication Data
US 2014/0145543 A1  May 29, 2014

(30) Foreign Application Priority Data

Aug. 25, 2010 (GB) .................................. 1014159.6

(51) Int. Cl.
| | |
|---|---|
| H02K 3/04 | (2006.01) |
| H02K 3/28 | (2006.01) |
| H02P 6/10 | (2006.01) |
| H02K 29/03 | (2006.01) |

(Continued)

(52) U.S. Cl.
CPC .................. *H02K 3/28* (2013.01); *H02K 16/02* (2013.01); *H02K 29/03* (2013.01); *H02P 6/005* (2013.01); *H02P 6/10* (2013.01)

(58) Field of Classification Search
CPC ......... H02K 3/28; H02K 16/02; H02K 29/03; H02K 11/0073; H02K 11/0068
USPC ....................................... 310/208, 68 R, 68 D
See application file for complete search history.

(56) References Cited

U.S. PATENT DOCUMENTS

| | | | |
|---|---|---|---|
| 3,091,728 A * | 5/1963 | Hogan et al. | ............. 318/400.41 |
| 4,284,940 A | 8/1981 | Welburn | |
| 4,896,088 A | 1/1990 | Jahns | |

(Continued)

FOREIGN PATENT DOCUMENTS

| | | |
|---|---|---|
| EP | 0074239 A1 | 3/1983 |
| GB | 2208046 A | 2/1989 |

OTHER PUBLICATIONS

International Search Report for PCT/GB2011/001232, completed Feb. 13, 2013, mailed Mar. 1, 2013, 3 pages.

(Continued)

*Primary Examiner* — Thanh Lam
(74) *Attorney, Agent, or Firm* — Chernoff, Vilhauer, McClung & Stenzel, LLP (57) ABSTRACT

An electrical machine (10) has three phase windings (12). Each phase winding (12) is connected to a respective current source (18). Each current source 18 provides alternating current to the corresponding winding (12). The current source 18 is connected independently to the respective winding (12). The electrical angles of the phase windings (12) are so arranged that none of the phase windings (12) has a zero torque angle which coincides with a zero torque angle of another phase winding (12).

12 Claims, 5 Drawing Sheets

(51) Int. Cl.
*H02P 6/00* (2006.01)
*H02K 16/02* (2006.01)

(56) References Cited

U.S. PATENT DOCUMENTS

| | | | |
|---|---|---|---|
| 5,821,722 | A | 10/1998 | Forbes et al. |
| 5,838,087 | A | 11/1998 | Tang |
| 2006/0175923 | A1* | 8/2006 | Abou Akar et al. ........... 310/114 |
| 2010/0123426 | A1* | 5/2010 | Nashiki et al. ................ 318/701 |
| 2013/0088128 | A1* | 4/2013 | Nakano ................ B62D 5/0406 310/68 R |

OTHER PUBLICATIONS

Search Report for Application No. GB1014159.6, completed Oct. 24, 2011, 1 page.

T.X. Mei, M. Shafik, R. Lewis, H. Walilay, M. Whitley D. Baker, "Fault Tolerant Actuation for Steer-by-Wire Applications," delivered at the IET Third Automotive Electronics Conference at Warwick, UK, during the conference period of Jun. 28 and 29, 2007, 8 pages.

* cited by examiner

ELECTRICAL MACHINES

CROSS-REFERENCE TO RELATED APPLICATION

This is a national stage application filed under 35 USC 371based on International Application No. PCT/GB2011/001232 filed Aug. 19, 2011, and claims priority under 35 USC 119 of United Kingdom Patent Application No. 1014159.6 filed Aug. 25, 2010.

The present invention relates to electrical machines. In particular, permanent magnet machines will be described. The application of these machines in the construction of motors and actuators will also be described.

In an aspect of the invention, there is provided a permanent magnet electrical machine comprising:
a plurality of phase windings;
a permanent magnet member movable relative to the phase windings;
a drive circuit for providing alternating drive current to each phase winding to create force on the permanent magnet member, the force output of each phase winding varying with the electrical angle created by the relative positions of the permanent magnet member and the respective phase winding, and including angles of zero force;
wherein the drive circuit comprises a plurality of current sources connected independently to respective phase windings; and
wherein the drive currents provided by the current sources create electrical angles of the phase windings which are so arranged that none of the phase windings has a zero torque angle which coincides with a zero torque angle of another phase winding.

Each current source may comprise supply conductors connecting the current source to the corresponding phase winding and having no electrical connection with the supply conductors of any other of the phase windings.

The zero force angles of the phase windings may be evenly distributed in electrical angle. Each zero force angle may be within a band of insufficient force in which the force of the corresponding phase winding is insufficient to drive the motor, and wherein the electrical angles of the phase windings are so arranged that none of the insufficient force bands overlap in electrical angle. The insufficient force bands may be evenly distributed in electrical angle.

The arrangement may comprise a number n of phase windings, each separated from adjacent phase windings by an electrical angle substantially equal to 360°/2n.

The plurality of phase windings may form a single permanent magnet motor. Alternatively, the plurality of phase windings may form a plurality of permanent magnet motors driving a common output member.

In another aspect, the invention provides an actuator comprising:
an output member;
and a permanent magnet electrical machine as defined above;
wherein the position of the output member is controlled, in use, by operation of the electrical machine.

Examples of the present invention will now be described in more detail, by way of example only, and with reference to the accompanying drawings, in which.

Figure 1:
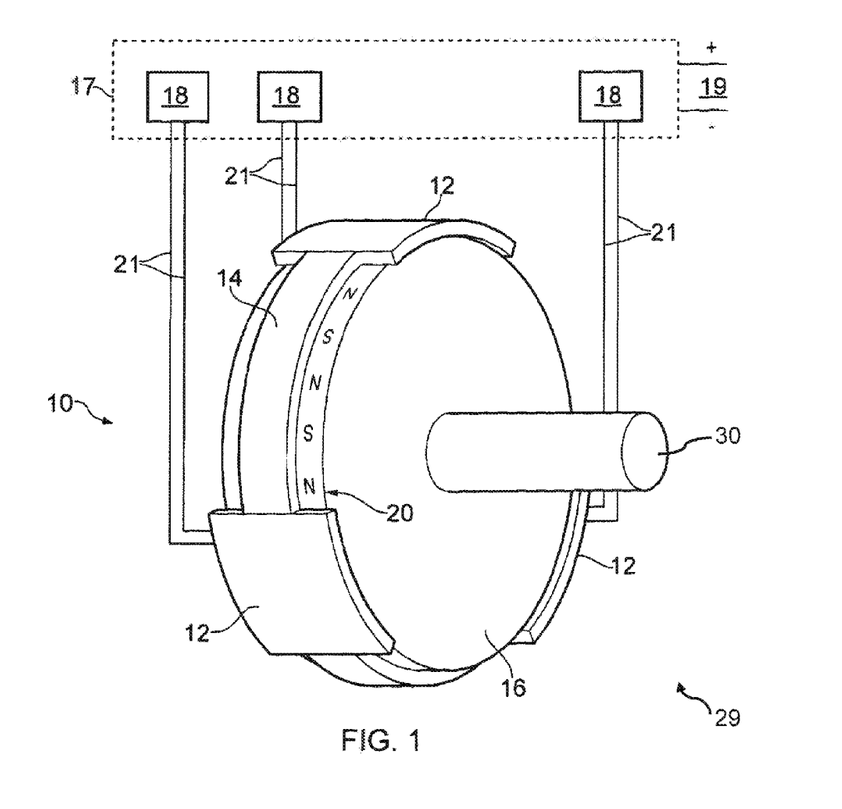
FIG. 1 is a simple schematic diagram of a permanent magnet motor.

FIG. 1 illustrates an electrical machine which is a permanent magnet motor arrangement 10. The arrangement 10 includes a plurality of phase windings 12. In this example, the phase windings 12 are arranged to form a stator 14. A permanent magnet member 16 is movable relative to the phase windings 12. Drive current for the phase windings 12 is provided from a drive source 17 which contains several control circuits 18. Each phase winding 12 has an associated control circuit 18 which acts as a source of alternating drive current for that phase winding 12. As will be described later, each of the current sources 18 is connected independently to a respective phase winding 12. Drive current in the phase windings 12 creates force to move the member 16, relative to the windings 12. The force output of each phase winding 12 varies with the instantaneous electrical angle of the phase winding, as will be described, and includes angles of zero torque.

In the example being described, as illustrated in FIG. 1, the machine 10 is a rotary machine. The phase windings 12 form part of a stator. The permanent magnet member 16 forms a rotor. This language will be used throughout the remainder of this description, for simplicity and clarity. However, it is to be understood that in other examples, the windings 12 may form part of a rotor, and the permanent magnet member may form a stator. The rotor may turn within the stator (as shown in FIG. 1) or around the stator. Furthermore, the electrical machine could be a linear machine, rather than a rotary machine, with the phase windings 12 forming part of the fixed or moving component of the machine, the other component including permanent magnets.

Since a rotary machine is being described, the forces created within the machine will manifest as torque, and will thus be described as such. It is to be understood that in a linear machine, forces are to be considered, rather than torque.

Figure 1A:
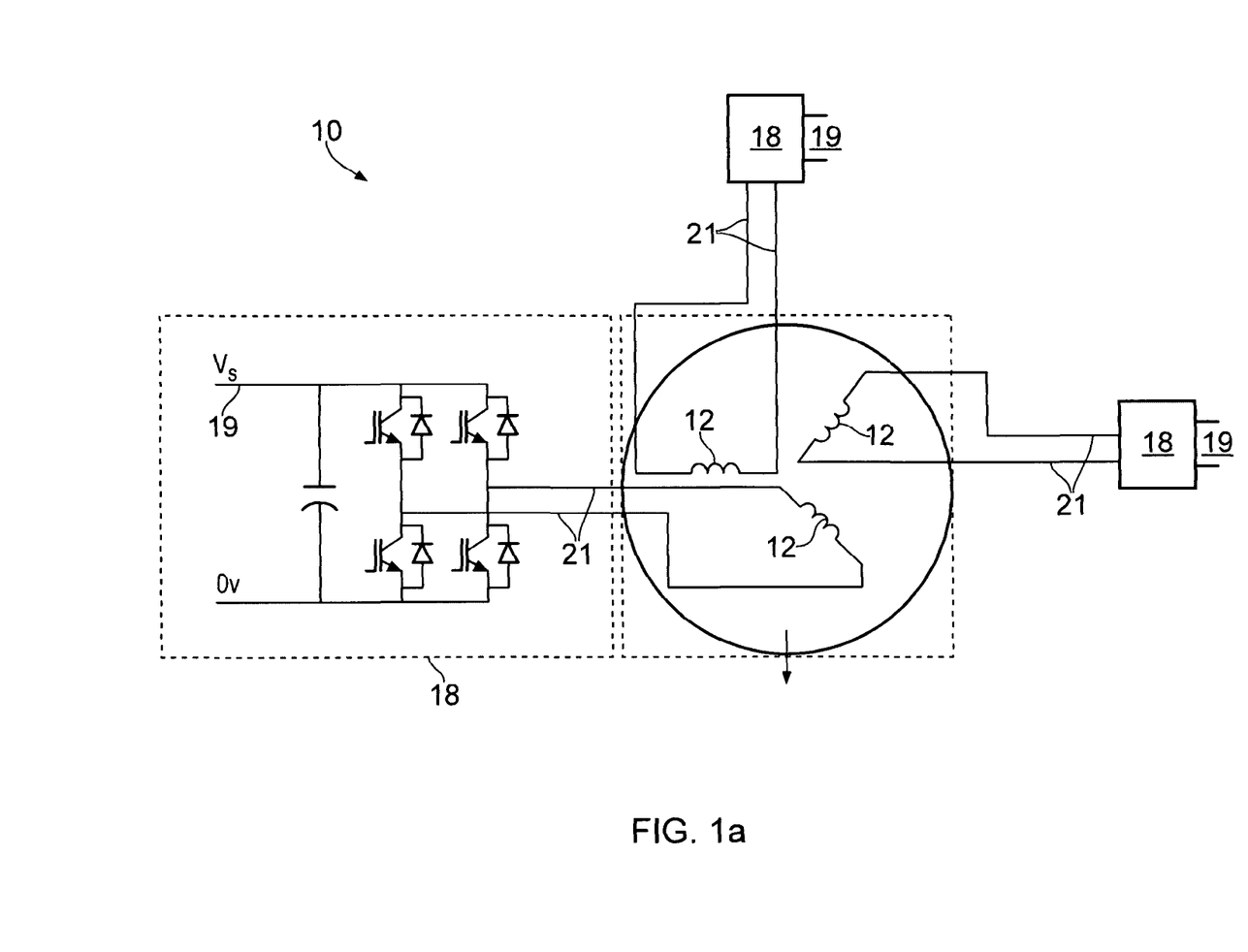
FIG. 1a illustrates the electrical circuit within the motor.

Turning to FIG. 1a, the electrical circuit of the machine 10 can be understood. In this example, three phase windings 12 are illustrated. Other numbers of phase windings could be used. Each phase winding 12 is connected to a respective current source 18, one of which is illustrated as a full H-bridge. The full bridge circuit is not illustrated within the other current sources 18, for simplicity. Other circuits could be used within the current sources 18. Each current source 18 provides alternating current to the corresponding winding 12, from a DC supply bus 19. The DC supply bus 19 may be common to each of the current sources 18. However, it is important to note that each current source 18 is connected independently to the respective phase winding 12. Thus, as can be seen from FIG. 1a, each current source 18 comprises a pair of supply conductors 21. Each pair of supply conductors 21 connects a current source 18 with the corresponding phase winding 12 and has no electrical connection with the supply conductors 21 of any other of the phase windings.

Returning to FIG. 1, the phase windings 12 are distributed to encircle the stator 14, as is illustrated highly schematically in FIG. 1. Each of the phase windings 12 is therefore at a different electrical angle. That is, as the rotor 16 turns to interact in a cyclic manner with the phase windings 12, any particular rotor position will represent a different position in the corresponding cycle of interaction with each phase winding 12. The electrical angles of the phase windings 12 are so arranged that none of the phase windings 12 has a zero torque angle which coincides with a zero torque angle of another phase winding 12, as will be described.

In more detail, the rotor 16 is fitted with permanent magnets 20 arranged sequentially at the circumference of the rotor 16 as a number of pole pairs indicated in FIG. 1 by the letters N-S-N-S. When electric currents are caused by the current source 18 to flow in the phase windings 12 of the stator 14, the phase windings 12 create magnetic flux in the region of the rotor 16. The magnetic flux of the phase windings 12 interacts with the magnetic flux of the magnets 20, producing force, and therefore torque between the rotor and stator. This causes movement of the rotor 16. In the following explanation, it will be assumed that, within the motor, cogging forces may be ignored (either because they have been designed out by the mechanical arrangement or by driving the windings to compensate).

Figure 2:
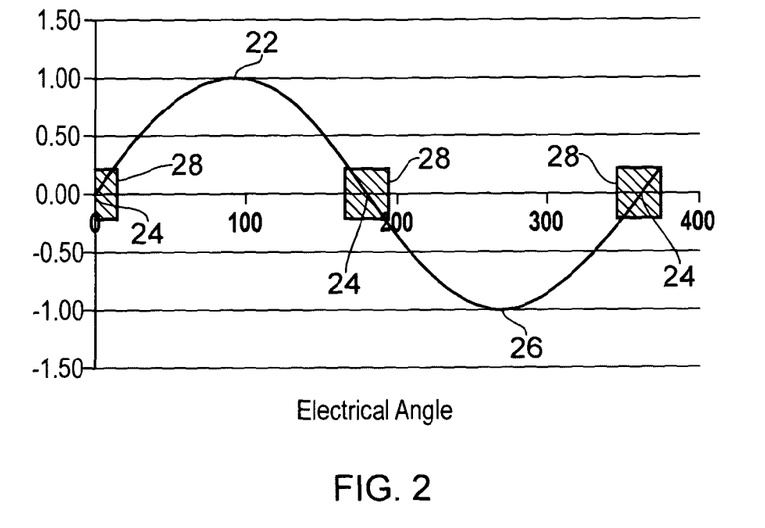
FIGS. 2 to 6 are force profiles of various arrangements of windings of the motor of FIG. 1.

If a constant current is passed through a single one of the phase windings 12 in the motor arrangement 10, the torque produced on the rotor 16 will vary as a function of the instantaneous electrical angle of the rotor 16. This is illustrated in FIG. 2, which has a horizontal axis showing the electrical angle, and a vertical axis indicating the torque produced at that angle. This torque profile will include a positive maximum torque output at 22, angles of zero torque 24 and a negative minimum torque output at 26. The torque profile may be a simple sinusoid, as illustrated or may be a trapezoidal or other function, or any combination, and may include harmonics. This explanation assumes a sinusoidal torque profile, for simplicity. The skilled reader will readily understand how the principles being explained can also be applicable to other possible torque profiles.

If the drive current to the phase winding 12 is varied with the electrical angle of the rotor 16, then different torque profiles can be generated. For example, by driving the winding harder when away from the maximum 22, and softer at and near the maximum 22, a constant (or more even) torque on the rotor 16 can be produced over a wide range of electrical angles. At electrical angles where a negative torque output is shown, the current in the winding 12 can be reversed, in order to continue generating positive torque in the rotor 16.

However a single phase winding 12 cannot be used to provide torque throughout the 360° electrical range since there will be two zero crossing points 24 in each 360° range. At these zero crossing points 24, no torque can be generated by the corresponding phase winding 12. Accordingly, the zero crossing points 24 are here termed "zero torque angles".

In practice, there will also be a band 28 of electrical angles to either side of each angle of zero torque 24, where either maximum current limits in the windings or magnetic saturation of the laminations or other electrical, magnetic or structural limitations restrict the ability of the phase winding 12 to generate adequate torque to turn the rotor 16. The extent of this unusable band 28 (here termed the "insufficient torque band") will depend on the parameters of construction of the motor arrangement 10 and its intended duty. The insufficient torque band 28 may be symmetrical or asymmetric about the zero torque angle 24.

Figure 3:
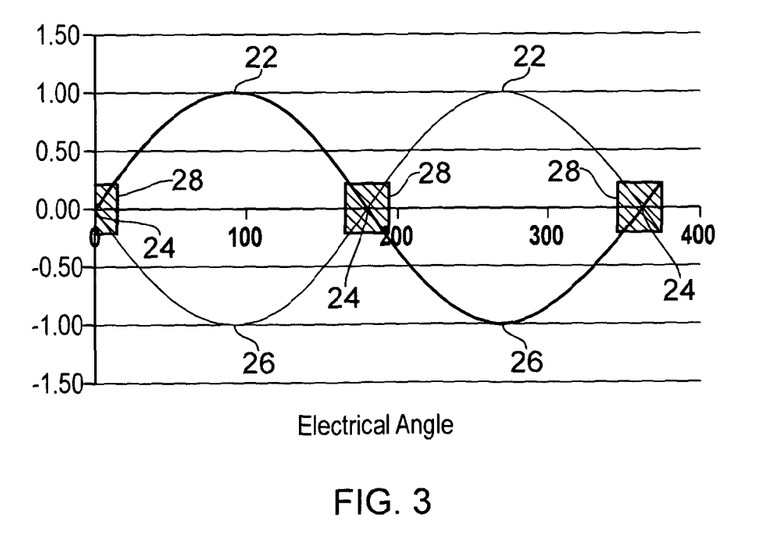

FIG. 2 considers the effect of a single phase winding 12. A second phase winding 12 can be considered, at a different electrical angle to the first. For example, FIG. 3 illustrates the possibility of two phase windings 12 arranged to be 180° apart in electrical angle, i.e. equidistant from each other in the electrical angle domain. In this arrangement, the zero torque angles 24 of the two phase windings 12 are coincident, and the corresponding insufficient torque bands 28 are overlapping. That is, there exist positions of the rotor, relative to the stator, at which both phase windings 12 are incapable of creating torque. (In an equivalent linear machine, both phase windings are incapable of creating force). Accordingly, two phase windings 12 arranged as indicated in FIG. 3 cannot be used to provide torque throughout the 360° electrical range, since there remain two zero torque angles 24 in each 360° range, at which no torque can be generated.

Figure 4:
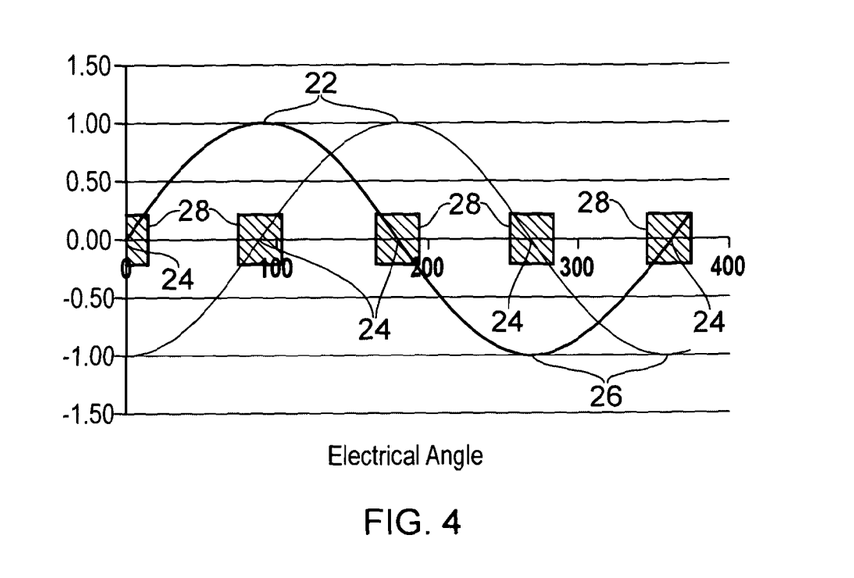

FIG. 4 illustrates an alternative arrangement of two phase windings 12. In this example, the relationship between these two windings is such that their zero torque angles 24 are no longer coincident. That is, the two torque profiles from the respective windings 12 do not share zero crossing points. Furthermore, their insufficient torque bands 28 are evenly distributed and do not overlap in the electrical angle domain. This is achieved by arranging the phase windings 12 to be 90° apart in electrical angle. The rotor 16 is therefore subjected to torque, and hence the motor arrangement 10 can be driven, at any electrical angle of the rotor 16.

In the example of FIG. 4, the separation of the windings 12 in electrical angle is such that the zero torque angles 24 are evenly distributed in the electrical angle domain. This is expected to result in the efficient creation and smooth progression of torque in the motor arrangement 10. In this example, the number n of phase windings 12 is n=2 and the adjacent phase windings are separated by an electrical angle which is substantially equal to 360°/2n, because 360°/2n=90°, when n=2. A further expected advantage in arranging the phase windings to be substantially 90° electrical apart is that mutual inductance effects experienced in driving the windings will be minimized.

Figure 5:
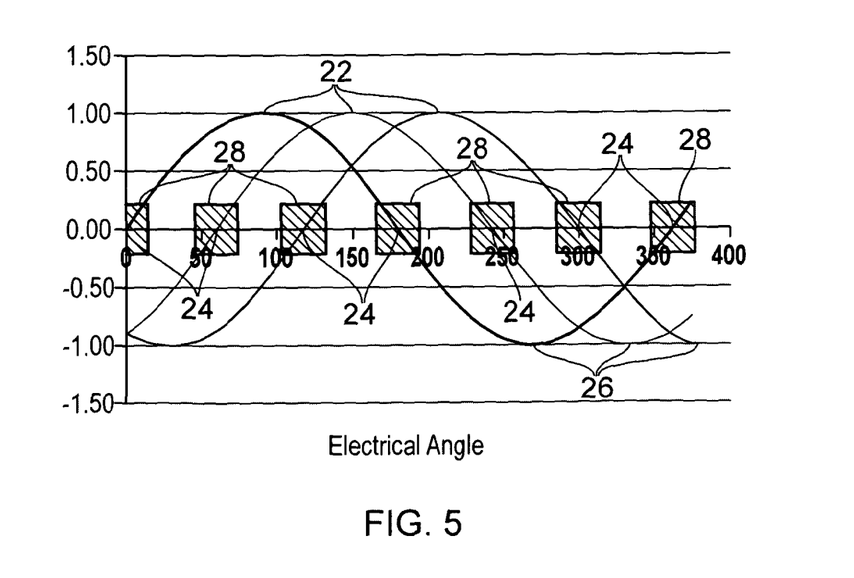

FIG. 5 illustrates an example in which three phase windings 12 are used, as illustrated in FIG. 1.

In FIG. 5, the three phases are arranged to be 60° apart in electrical angle. This results in the zero torque angles 24 of the various phase windings 12 being evenly distributed 60° apart in electrical angle. Thus, as can readily be seen from FIG. 5, none of the three phase windings 12 has a zero torque angle 24 which coincides with a zero torque angle 24 of another phase winding 12. Furthermore, the insufficient torque bands 28 of the three phase windings 12 are also evenly distributed in electrical angle and this arrangement results in none of the insufficient torque bands 28 overlapping in electrical angle.

In this example, the arrangement comprises a number n=3 of phase windings 12, each separated from adjacent phase windings 12 by an electrical angle equal to 360°/2n, because 360°/2n=60°, when n=3. A conventional 3 phase machine with 120° phase separation will also conform to the 60° separation arrangement shown in FIG. 5 provided the phases are fed independently and one of the phase feeds is reversed.

The example of FIG. 5 has significance in relation to fault tolerance. Fault tolerance is a significant issue in motor design, particularly for some applications. For example, the electrical motor arrangements being described could be used within an actuator 29 (FIG. 1) to control the position of an output member 30 of the actuator 29 by operation of the motor arrangement. If the actuator is used for a purpose for which fault tolerance is required, such as a safety critical function, fault tolerance will be required within the motor arrangement.

Consideration of FIG. 5 shows that at every electrical angle, throughout the 360° range, at least two of the phase windings 12 are outside their insufficient torque bands 28 and are therefore creating sufficient torque for the rotor 16 to be turned. Therefore, if any single phase were to fail, drive to the rotor 16 would be maintained by the other two phases. This represents a single level of fault tolerance achieved from using three independently driven phases. In addition, the independence of the connections provided by the supply conductors 21 between the current sources 18 and the respective phase windings 12 means that in the event of a fault, the drive current and drive voltage provided by the operational current sources 18 will continue to be supplied to their respective phase windings 12, regardless of any fault in a faulty phase winding or its associated current source 18 or supply conductors 21.

Figure 6:
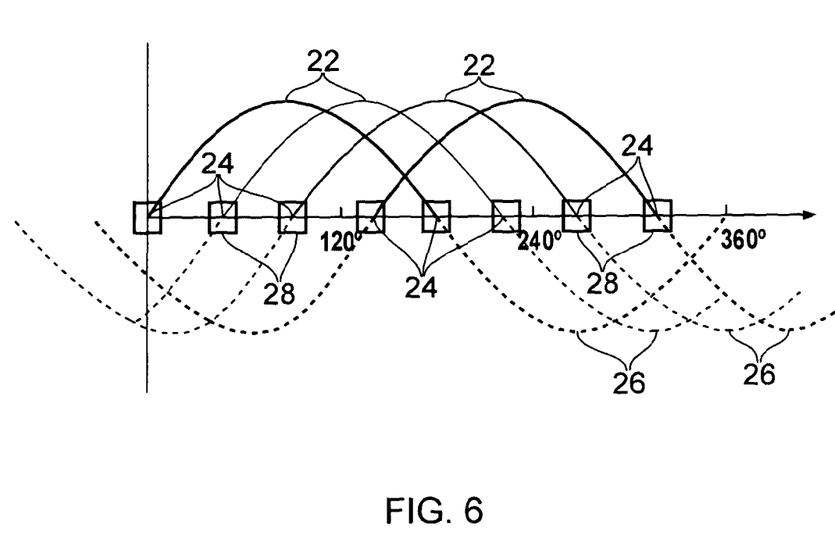

FIG. 6 illustrates a further example. In this example, four phase windings 12 are driven independently. These phase windings may form four phase windings 12 of a single permanent magnet motor arrangement 10, or the motor arrangement 10 may be in the form of a pair of permanent magnet motors, each being a two phase motor, the two motors driving a common output member, such as a rotating shaft. In order to minimise mutual inductance effects, each of the pair of motors would have windings substantially 90° electrical apart, and the two motors relatively displaced substantially by 45° electrical, resulting in a combination of four windings 45° apart.

In the example of FIG. 6, the zero torque angles 24 of the four phase windings 12 are again evenly distributed in electrical angle, one occurring every 45°. Thus, as can readily be seen from FIG. 6, none of the four phase windings 12 has a zero torque angle 24 which coincides with a zero torque angle 24 of another phase winding 12. Furthermore, the insufficient torque bands 28 of the four phase windings 12 are also evenly distributed in electrical angle and this arrangement results in none of the insufficient torque bands 28 overlapping in electrical angle.

In this example, the arrangement comprises a number n=4 of phase windings 12, each separated from adjacent phase windings 12 by an electrical angle equal to 360°/2n, because 360°/2n=45°, when n=4.

The example of FIG. 6 again has significance in relation to fault tolerance. At every electrical angle, throughout the 360° range, at least three of the phase windings 12 are outside their insufficient torque bands 28 and are therefore creating sufficient torque for the rotor 16 to be turned. Therefore, if any two phases were to fail, drive to the rotor 16 would be maintained by the remaining two phases. This represents a level of two fault tolerance achieved from using four independently driven phases. Again, the independence of the connections provided by the supply conductors 21 between the current sources 18 and the respective phase windings 12 provides a further contribution to the fault tolerance achieved.

In each of the examples described above, the level of tolerance to phase failure is enhanced by spreading the zero torque angles of the various phases so that they are spread out along the electrical angle axis and so that none of the zero torque angles 24 coincide and none of the insufficient torque bands 28 overlap.

These examples spread the phases out evenly, but many other arrangements could be used without zero torque angles 24 coinciding, or insufficient torque bands 28 overlapping. This will ensure that, in the worst case, even if only 2 adjacent phases remain, then the motor can still be operated. Accordingly, the level of fault tolerance which can be achieved from n phase windings 12 will be:

Fault tolerance (n phase windings)=n−2

This principle is shown in the following table:

| Number of independently driven phases (number = n) | Number of zero crossing points in 360° (number = 2n) | Phase separation (angle = 360°/2n) | Level of fault tolerance achieved |
| --- | --- | --- | --- |
| 2 | 4 | 90° | 0 |
| 3 | 6 | 60° | 1 |
| 4 | 8 | 45° | 2 |
| 5 | 10 | 36° | 3 |

The table could be extended further, by considering larger numbers of phase windings 12. However, we envisage that as the number of phase windings grows large, there will be an increasing difficulty in avoiding the insufficient torque bands 28 overlapping. Moreover, although levels of fault tolerance higher than 2 or 3 could be envisaged on this basis, we believe that they would rarely be required in practice.

Many variations and modifications can be made to the examples described above, without departing from the scope of the present invention. For example, other arrangements for separating the phases, in electrical angle, could be chosen. In practice, the choice may depend on the torque profile, with electrical angle, of the phase windings under consideration. That is, whereas these examples have assumed the simplicity of a sinusoidal torque profile, with an insufficient torque band 28 distributed evenly around each zero torque angle 24, practical situations are likely to have greater complexity than this, particularly in relation to the shape of the torque profile and the width and position of the insufficient torque band 28, relative to the zero torque angle 24.

Further windings could be provided, in addition to those described. For example each of the windings could be duplicated. However, these extra windings would be additional to the plurality of windings arranged to have zero torque angles which do not coincide.

Motor arrangements of the type described above can be used on many different applications, such as those in which fault tolerance is required. Examples include actuators for applications in which fault tolerance is required, particularly for safety critical functions.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. A permanent magnet electrical machine comprising:
   a plurality of phase windings;
   a permanent magnet member movable relative to the phase windings;
   a drive circuit for providing alternating drive current to each phase winding to create force on the permanent magnet member, the force output of each phase winding varying with the electrical angle created by the relative positions of the permanent magnet member and the respective phase winding, and including angles of zero force;
   wherein the drive circuit comprises a plurality of current sources connected independently to respective phase windings; and
   wherein the drive currents provided by the current sources create electrical angles of the phase windings which are so arranged that none of the phase windings has a zero torque angle which coincides with a zero torque angle of another phase winding.

2. A machine according to claim 1, wherein each current source comprises supply conductors connecting the current source to the corresponding phase winding and having no electrical connection with the supply conductors of any other of the phase windings.

3. A machine according to claim 1, wherein the zero force angles of the phase windings are evenly distributed in electrical angle.

4. A machine according to claim 1, wherein each zero force angle is within a band of insufficient force in which the force of the corresponding phase winding is insufficient to drive the motor, and wherein the electrical angles of the phase windings are so arranged that none of the insufficient force bands overlap in electrical angle.

5. A machine according to claim 4, wherein the insufficient force bands are evenly distributed in electrical angle.

6. A machine according to claim 1, comprising a number n of phase windings, each separated from adjacent phase windings by an electrical angle substantially equal to 360°/2n.

7. A machine according to claim 1, wherein the plurality of phase windings form a single permanent magnet motor.

8. A machine according to claim 1, wherein the plurality of phase windings form a plurality of permanent magnet motors driving a common output member.

9. An actuator comprising:
an output member;
and a permanent magnet electrical machine according to claim 1;
wherein the position of the output member is controlled, in use, by operation of the electrical machine.

10. A machine according to claim 1, further comprising one or more control circuits configured to provide to each phase winding an alternating drive current whose current direction is reversible.

11. A machine according to claim 1, further comprising one or more control circuits configured to provide a controlled source of alternating drive current such that a predetermined alternating drive current is provided to each phase winding so as to provide a predetermined torque profile.

12. A machine according to claim 1, further comprising one or more control circuits configured to provide a controlled source of alternating drive current such that a predetermined alternating drive current is provided to each phase winding so as to provide a substantially constant torque profile.

* * * * *